3,198,736
LUBRICATING COMPOSITION

Bennett M. Henderson, Edwardsville, Ill., assignor to Shell Oil Company, New York, N.Y., a corporation of Delaware
No Drawing. Filed Dec. 18, 1962, Ser. No. 245,378
3 Claims. (Cl. 252—46.7)

This invention relates to lubricating oil compositions which are highly detergent and also wear and sludge resistant.

It is known that non-ash forming nitrogen-containing polymers such as commercially avalaible copolymers of long-chain alkyl acrylates and a polymerizable compound containing a basic amino group or amido group such as copolymers of long-chain alkyl methacrylates and aminoalkylmethacrylate or vinyl pyrrolidone, respectively, possess good detergent properties, but in lubricating oil compositions subjected to wide temperature and pressure conditions, they lack stability and wear resistant properties and in the presence of metal salts such as metal sulfonates they tend to complex and form sludge. Attempts to improve these polymers by modifying their structure or by means of secondary additives has not been too successful.

It has now been discovered that certain non-ash nitrogen-containing detergent polymers can be rendered sludge and wear resistant and their stability greatly improved by addition to lubricating oils containing such non-ash forming detergent polymers, small amounts each of a mixture which function synergistically together and in combination with the polymeric detergents said mixture comprising of (I) an oil-soluble p,p'-methylene bisphenol represented by the formula:

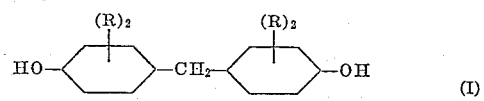

(I)

where the R's are $C_4$–$C_8$ tertiary alkyl groups preferably in the 2,6,2',6' positions and (II) an oil-soluble polyaryl polyamine having the formula:

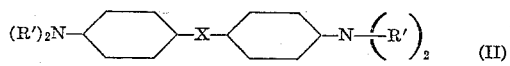

(II)

where X is oxygen, sulfur, or a methylene radical and R' is a $C_{1-8}$ alkyl radical such as methyl, ethyl, propyl, isopropyl, butyl, isobutyl, t-butyl, amyl, hexyl, octyl radicals or mixtures thereof. If desired a small amount of highly sulfurized hydrocarbon can be blended into the final composition to improve the anti-wear and extreme pressure properties of the composition particularly when such compositions are subjected to extreme pressure and elevated temperatures as encountered in heavy duty engines and the like.

The polymeric detergents which function synergistically with inhibitors (I) and (II) are derived from nitrogen-containing polymerizable monomers containing primary, secondary or tertiary (the latter two are preferred) amino nitrogen, including heterocyclic amino containing substances, having an ethylenically unsaturated polymerizable group. These detergent polymers may be obtained by polymerizing vinyl substituted heterocyclic amino nitrogen-containing substances such as vinylpyridine, or polyamines prepared by reducing, in the presence of ammonia or primary or secondary amines, with polymerizable unsaturated alcohols, acids or esters such as acrylates and methacrylates of long-chain fatty acids, and the like. The preferred polymeric amino compounds are those containing tertiary amine groups and particularly those containing heterocyclic amino groups such as obtained by co-polymerizing a polymerizable heterocyclic nitrogen base compound with a polymerizable unsaturated material free of heterocyclic nitrogen-containing radicals which can be illustrated by: copolymers of stearyl methacrylate, lauryl methacrylate and 2-methyl-5-vinylpyridine; and those which contain additional $C_{1-4}$ alkyl methacrylates in the polymer, such as copolymers of stearyl methacrylate, lauryl methacrylate, methyl methacrylate and 2-methyl-5-vinylpyridine; and similar copolymers in which the methyl methacrylate is replaced by butyl methacrylate and 2-methyl-5-vinylpyridine is replaced by 5-ethyl-2-vinylpyridine. Other suitable polymeric amine detergent copolymers of $C_{8-18}$ alkyl acrylates, e.g. lauryl methacrylate and amino alkyl acrylates, e.g. diethylaminoethylmethacrylate. Also suitable are vinyl pyrrolidone-containing polymer or similar copolymers as described in Belgian Patent 550,442 and British Patent 808,664, and mixtures thereof. Acrylate vinyl pyrrolidone copolymers are sold by Rohm and Haas under the designations Acryloid 315X or 917 or 966 and are copolymers of N-vinyl pyrrolidone and lauryl methacrylate of varying molecular weights.

Still another class of basic amino nitrogen-containing detergent polymers are polymeric amino-imide-containing detergents such as N-dialkylamino alkyl alkenyl succinimides and illustrated by N-dimethylaminopropyl polybutenyl succinimide, or tetraethylene pentamine derivative of polybutenyl succinic anhydride and the like.

Preferred basic amino detergent polymers are illustrated by the following examples.

EXAMPLE I

A mixture of 25% of 2-methyl-5-vinylpyridine and 75% stearyl methacrylate were heated in a 50–50 mixture of benzene and light mineral oil (East Texas 100 SSU at 100° F. neutral) to about 120° C. at which time 0.25% wt. of ditert.butyl peroxide was added and the reaction mixture was maintained at this temperature for about 6 hours.

At the completion of the reaction, the solvent was stripped off and the polymer diluted with neutral oil to a polymer content of about 30% by weight and filtered at 100–120° C. The copolymer had a molecular weight of about 200,000 and a nitrogen content of 2.94%.

EXAMPLE II

30% stearyl methacrylate, 51% lauryl methacrylate, 14% methyl methacrylate and 5.0% 2-methyl-5-vinylpyridine were charged to a 300 gallon stainless steel autoclave. A 50–50 mixture of benzene and neutral petroleum oil was then added to the autoclave so as to finish 1 part of the mixture per 3 parts of the total monomer. 0.25% of ditert.butyl was then added and the mixture heated at 120° C. for about 7 hours.

At the completion of the reaction, the benzene was stripped off to final conditions of 120° C. and 10 mm. Hg with nitrogen purging. The benzene-free product was then diluted with neutral oil to a polymer content of about 30% by weight and filtered at 100–120° C. The polymers have a molecular weight of about 600,000, a nitrogen content of 0.54% and a pKa value of 4.8.

EXAMPLE III (INTERMEDIATE)

A mixture of 1000 gms. (1 mole) of a polybutene having a molecular weight of about 1000 and 98 gms. (1 mole) of maleic anhydride was heated at 410° F. in a nitrogen atmosphere with agitation for a period of 24 hours. The reaction mixture was cooled to 150° F. and 700 cc. of hexane added; after which the mixture was filtered under vacuum. After vacuum distillation to remove the hexane from the filtrate, the product was maintained at 350° F. at an absolute pressure of 10 mm. Hg for one hour to remove traces of maleic anhydride.

The crude polybutenyl succinic anhydride thus prepared had a saponification number of 79.

EXAMPLE IIIa—PREPARATION OF TETRAETHYL-ENEPENTAMINE DERIVATIVE OF THE POLYBUTENYL SUCCINIC ANHYDRIDE OF EXAMPLE III HEREINABOVE

A mixture of 84 gms. (0.45 mol) of the tetraethylene pentamine and 702 gms. (0.45 mol) of the polybutenyl succinic anhydride of Example III hereinabove, was blended with agitation at 125° F. in a nitrogen atmosphere. The temperature was increased to 400° F. during a period of one hour, after which the absolute pressure was reduced to about 200 mm. Hg during a period of 30 minutes to facilitate the removal of water. The reaction mixture was then allowed to reach room temperature at this reduced pressure. The reaction product contained 5.1% nitrogen (theory=5.4%). Infra-red analysis showed that the reaction product was imide containing a polybutene side chain.

EXAMPLE IV

A mixture of 21.3 gms. (0.21 mole) of dimethylaminopropylamine and 150 gms. (0.09 mol) of the polybutenyl succinic anhydride of Example II hereinabove, was blended with agitation in a nitrogen atmosphere, and the mixture was heated at 500° F. for a period of one hour, after which the absolute pressure was reduced to about 200 mm. Hg at this temperature during a period of 30 minutes to facilitate the removal of water and excess amine. The reaction mixture was then allowed to reach room temperature at this reduced pressure. The reaction product contained 1.7% nitrogen (theory 1.8%) and pKa value of 9–10. The identity of the N-dimethylaminopropylalkenyl succinimide was established by means of infra-red spectroscopy.

EXAMPLE V

Polyisobutylene succinic anhydride was prepared by reacting a polyisobuytlene (M.W. 850) and succinic anhydride at around 400° F. About 500 gms. of polyisobutylene succinic anhydride thus formed was admixed with 50 gms. of diethylenetriamine in toluene at ambient temperature. The amine was added in increments and the temperature controlled so as not to rise above about 120° F. The reaction proceeded for 15 to 30 minutes after which the solvent was removed and the end product, a semi-amide of the above reactants, had a nitrogen-content of 1.6%.

EXAMPLE VI—TETRAETHYLENE PENTAMINE DIIMIDE OF MONO(POLYISOBUTYLENE)SUCCINIC ACID

Polyisobutylene having a molecular weight of 1185 and bromine number of 21 was heated to 212° F. and an equivalent amount of maleic anhydride was added slowly over a period of about 30 minutes. The reactants were heated to 390° F. to 400° F. and maintained at this temperature for 16 hours. On cooling, mono(polyisobutylene)succinic anhydride was recovered by dissolving in 1.5 liters of petroleum spirit (60–80° C. B. P.) and recovering the product by filtering. About 2 moles of this product was admixed with one mole of tetraethylene pentamine and added to a petroleum spirit solution. The petroleum spirit was distilled off and replaced by 1 liter of toluene which was also distilled off to aquotropically remove water, and the residue was heated to 390° F. to 400° F. and maintained at this temperature for three hours. The recovered product, tetraethylenetriamine diimide of mono(polyisobutylene)succinic acid.

Other representative copolymers useful in lubricating compositions of this invention include those identified below in which the monomeric units are present in the mol ratios of 1:1, 1:2, 1:4, 1:6, 1:8, 1:10 and 1:20, of the monomer containing the oleophilic unit to the amino nitrogen-containing polymerizable material, respectively, said copolymers having a molecular weight in excess of 50,000 and over 2,500,000: lauryl methacrylate/styrene/2-methyl-2-vinylpyridine, lauryl methacylate/styrene/2-methyl-5-octyl methacrylate/N-vinyl-3-methyl pyrrolidone/cetyl methacrylate, N - vinyl pyrrolidone/stearyl methacrylate, N-vinyl pyrrolidone/stearyl acrylate, N-vinyl-3,3-dimethyl pyrrolidone/lauryl methacrylate, N-vinyl pyrrolidone stearyl methacrylate/cetyl methacrylate, N-vinyl-3-methyl pyrrolidone/stearyl methacrylate/lauryl methacrylate and mixtures thereof. The molecular weights of the polymer were determined by the light scattering method.

The phenolic compounds represented by Formula I are oil-soluble bisphenol compound such as: 1,1-bis(3,5-ditert-butyl-4-hydroxyphenyl)methane 1,1 - bis(3,5 - diisopropyl-4-hydroxphenyl)methane; 1,1-bis(3,5 - disec-butyl-4-hydroxyphenyl)methane; 1,1-bis(3-isopropyl - 5-tert-butyl-4-hydroxyphenyl)methane; 1,1-bis(3,5 - di(2-oxtyl)-4-hydroxyphenyl)methane; 1,1-bis(3 - sec - butyl-5(2-hexyl)-4-hydroxyphenyl)methane; 1,1 - bis(2 - tert-butyl-5-methyl-2 - hydroxyphenyl)methane and mixtures thereof.

The polyaryl polyamine compounds represented by Formula II include (a) N,N'-bis(dialkyl aminophenyl) methane and (b) N,N'-bis(dialkyl aminophenyl)ether or thioether. The compounds of II(a) can be prepared by suitable means such as by reacting N,N-dialkyl aniline in an acid medium and adding formaldehyde to the reaction at low temperature of below 40° C. and thereafter allowing the reaction to raise to 60–150° C. for several hours after which the end product is recovered. In the reaction it is preferred that an excess of 40–100% of the amine be used. Thus, N,N' - bis(dimethyl aminophenyl)methane (Ex. A) was prepared by adding 3 moles of N,N'-dimethyl aniline and 1 mole of formaldehyde (10% solution) to hydrochloric acid at 60–75° C. and the mixture heated for 1–2 hours after which the end product was recovered. Other examples include: N,N'-bis(diethyl aminophenyl) methane, N,N' - bis(dipropyl aminophenyl)methane, N,N' - bis(dibutyl aminophenyl)methane, N,N' - bis(ditert. butyl aminophenyl)methane, N,N' - bis(diamyl aminophenyl)methane, N,N'-bis(dioctyl aminophenyl)methane. The ether or thioethers of I(b) include N,N'-bis(dimethyl aminophenyl)ether, N,N'-bis(dipropyl aminophenyl) ether, N,N'-bis(ditert.butyl aminophenyl)ether, N,N'-bis-(dioctyl aminophenyl)ether and their thioether derivatives. Preferred compounds are N,N' - bis(ditert.butyl phenyl)ether and N,N'-bis(ditert.butyl phenyl)methane.

The nitrogen-containing polymeric detergents are used in amounts of from about 0.5% to about 15% preferably between 1% and 10% by weight which each of the compounds (I) and (II) are used in amounts varying between 0.1% and 5% by weight and the proportion of (I) to (II) can vary from 5% to 95% to 95% to 5% respectively and preferably between 40% to 60%. The percentages are by weight.

The other additive which is particularly useful in compositions of the present invention is an oil-soluble sulfurized hydrocarbon. Such sulfurized products result from reacting $C_{8-20}$ aliphatic olefins or terpenes with a sulfurizing agent such as sulfur, sulfur chloride, hydrogen sulfide, phosphorus sulfide and mixtures thereof. Preferred olefins are the terpenes such as pinene, limonene, terpinene, dipentene, fenchene or olefinic polymers of polypropylene, polybutylene and mixtures thereof. The sulfurization is accomplished at 100–450° F. in non-oxidizing atmosphere. A preferred sulfurized material is obtained by reacting a terpene (pinene) with about 10% $P_2S_5$ at between 300–400° F. After the completion of the reaction, excess $P_2S_5$ is removed by filtration or other suitable means. A $P_2S_5$-terpene reaction product particularly useful is available from Monsanto as Santolube 394–C and has the following properties:

| | |
|---|---|
| Specific gravity at 60°/60° F. | 1.02 |
| Viscosity: | |
|    S.U.S. at 210° F. | 90 |
|    S.U.S. at 100° F. | 2850 |
| Flash point, ° F. | 200 |
| Color ASTM (diluted) | 3 |
| Percent phosphorus | 4.7 |
| Percent sulfur | 13.0 |

Another desirable product obtained by similar means is the reaction product of $P_2S_5$ and turpentine oil. The amount of such reaction products which can be incorporated in composition of the present invention can vary from about 0.5% to about 2% by weight.

The mineral lubricating oils may be derived from a variety of petroleum base stocks and are preferably paraffinic and/or naphthenic in character; they may also contain substantial proportions of hydrocarbons having aromatic character. The viscosity may vary within wide limits so that the oils may belong, for example, to SAE classes 5W, 10W, 20W, 20, 30, 40, 50, 60, or 70. Suitable oils may be derived from highly paraffinic crudes in which case distillation and/or dewaxing may be sufficient to provide a suitable base stock; chemical or selective solvent treatment may be used if desired, but is preferably kept to a minimum for economic reasons. Mixed-base crudes and even highly aromatic crudes which contain paraffinic hydrocarbons also provide suitable oil base stocks after refining by well-known techniques such as the separation of distillate fractions of suitable boiling range followed by solvent extraction with selective solvents, for example furfural or phenol, to provide raffinate fractions, dewaxing, and chemical treatment, for example sulfuric acid treatment.

Illustrative compositions of the present invention are as follows:

*Composition A*

| | Percent weight |
|---|---|
| Example II polymer | 5 |
| N,N'-bis(ditert.butyl aminophenyl)ether | 0.5 |
| 1,1-bis(3,5-ditert.butyl-4-hydroxy phenyl)methane | 0.5 |
| $P_2S_5$-terpene reaction product (4.7% P, 13% S) | 1.28 |
| Mineral lubricating oil (SAE 30) | Balance |

*Composition B*

| | Percent weight |
|---|---|
| Example II polymer | 5 |
| N,N'-bis(ditert.butyl aminophenyl)methane | 0.5 |
| 1,1-bis(3,5-ditert.butyl-4-hydroxy phenyl)methane | 0.5 |
| $P_2S_5$-terpene reaction product (4.7% P, 13% S) | 1.28 |
| Mineral lubricating oil (SAE 30) | Balance |

*Composition C*

| | Percent weight |
|---|---|
| Example IIIa polymer | 5 |
| N,N'-bis(ditert.butyl aminophenyl)ether | 0.5 |
| 1,1-bis(3,5-ditert.butyl-4-hydroxy phenyl)methane | 0.5 |
| $P_2S_5$-terpene reaction product (4.7% P, 13% S) | 1.28 |
| Mineral lubricating oil (SAE 30) | Balance |

*Composition D*

| | Percent weight |
|---|---|
| Example II polymer | 5 |
| N,N'-bis(ditert.butyl aminophenyl)thioether | 0.5 |
| 1,1-bis(3,5-ditert.butyl-4-hydroxy phenyl)methane | 0.5 |
| Mineral lubricating oil (SAE 30) | Balance |

*Composition E*

| | Percent weight |
|---|---|
| Example I polymer | 3.5 |
| N,N'-bis(ditert.butyl aminophenyl)methane | 0.4 |
| 1,1-bis(3,5-ditert.butyl-4-hydroxy phenyl)methane | 0.2 |
| $P_2S_5$-terpene reaction product | 1.0 |
| Mineral lubricating oil (10W–30) | Balance |

The superiority of lubricating oil compositions of the present invention is demonstrated by operating a gasoline engine for 110 hours at 270° F. oil temperature and thereafter observing the condition of the engine and comparing it with modified compositions of the present invention such as:

X (mineral lubricating oil+5% copolymer Ex. II+0.5% bis(3,5-ditert.butyl-4-hydroxy phenyl)methane+1.28% $P_2S_5$-terpene reaction product).

Y (mineral oil+5.5% copolymer of N-vinyl pyrrolidone/lauryl methacrylate+1% Ca petroleum sulfonate +0.5% zinc diamyl dithiocarbamate+0.83% $P_2S_5$-terpene reaction product)

The results are shown in Table I.

TABLE I

| | Composition A (present invention) | Composition B (present invention) | Composition X | Composition Y |
|---|---|---|---|---|
| Sludge Rating (10=perfect) | 9.4 | 9.4 | 8.0 | 8.9 |
| Dispersancy life (Hrs.) | 110 | 110 | 75 | 100 |
| Used oil Vis. SUS at 100° F., 110 hrs | 499 | 499 | 1,680 | 1,680 |

In actual field tests in automotive engines, e.g. Ford and Chevrolet cars, operations under stop and go conditions after 25,000 miles compositions A or B of the present invention left clean engines which were in excellent conditions showing no signs of wear or corrosion whereas composition X at the end of 10,000 miles caused sludge and engine deposits.

Other additives may also be incorporated into the lubricating composition according to the invention, for example anti-scuffing agents; anti-foaming agents, e.g. silicone polymers; viscosity index improvers, for example polymeric acrylic esters of the Acrylod 150 and 710 class; extreme pressure additive, such as: dibenzyl disulfide, rust inhibitors, such as sorbitan monoleate or butyl stearate; oiliness agents, such as acidless tallow, oleic acid and the like.

I claim as my invention:

1. A lubricating oil composition comprising a major amount of mineral lubricating oil and from about 1% to about 15% of an oil-soluble copolymer of C-vinyl pyridine, and a mixture of dissimilar $C_{12-18}$ alkyl acrylates, the mol ratio of C-vinyl pyridine to the acrylate ester mixture being in the ratio of 1:1 to 1:20, respectively, and the copolymer having a molecular weight range of from about 50,000 to about 2,500,000 and from about 0.1% to about 5% each of bis(3,5-ditertbutyl-4-hydroxyphenyl) methane and N,N'-bis(di-$C_{1-8}$-alkylaminophenyl)methane, and from about 0.5% to about 2% of a reaction product of $P_2S_5$ and terpene.

2. The composition of claim 1 where the C-vinylpyridine is 2-methyl-5-vinylpyridine and the acrylate mixture is a mixture of lauryl and stearyl methacrylates, the mol ratio of the 2-methyl-5-vinyl pyridine to the methacrylate ester mixture being in the ratio of 1:1 to 1:20, respectively.

3. A lubricating oil composition comprising a major amount of mineral lubricating oil and from about 1% to about 10% of an oil-soluble copolymer of 2-methyl-5-vinylpyridine and a mixture of lauryl and stearyl methacrylates, the mol ratio of the 2-methyl-5-vinyl pryridine to the methacrylate ester mixture being in the ratio of 1:1 to 1:20, respectively, and the copolymer having an average molecular weight of from $5 \times 10^4$ to $2.5 \times 10^6$ and a mixture of from 0.1% to about 1% each of bis(3,5-ditert.butyl-4-hydroxyphenyl)methane and N,N'-bis(ditert. butyl aminophenyl)methane and from about 0.5% to about 5% of a reaction product of $P_2S_5$ and terpene.

(References on following page)

References Cited by the Examiner
UNITED STATES PATENTS

| | | | |
|---|---|---|---|
| 2,654,712 | 10/53 | Cyphers et al. | 252—46.6 |
| 2,715,106 | 8/55 | Brennan et al. | 252—46.6 X |
| 2,744,070 | 5/56 | Baker et al. | 252—45 |
| 2,812,320 | 11/57 | Beare | 252—46.6 X |
| 2,944,086 | 7/60 | Coffield et al. | 252—52 |
| 3,018,250 | 1/62 | Anderson et al. | 252—51.5 |
| 3,093,586 | 6/63 | Cyba | 252—51.5 |
| 3,100,749 | 8/63 | Wittner et al. | 252—51.5 |

FOREIGN PATENTS

| | | |
|---|---|---|
| 1,254,094 | 1/61 | France. |
| 1,265,086 | 5/61 | France. |

DANIEL E. WYMAN, *Primary Examiner.*